(12) United States Patent
Alfonso et al.

(10) Patent No.: US 8,259,790 B2
(45) Date of Patent: Sep. 4, 2012

(54) METHOD FOR THE FRAME-RATE CONVERSION OF A VIDEO SEQUENCE OF DIGITAL IMAGES, RELATED APPARATUS AND COMPUTER PROGRAM PRODUCT

(75) Inventors: Daniele Alfonso, Magenta (IT); Daniele Bagni, Olgiate Molgora (IT); Fabrizio Rovati, Cinisello Balsamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1527 days.

(21) Appl. No.: 11/784,469

(22) Filed: Apr. 5, 2007

(65) Prior Publication Data

US 2007/0268965 A1 Nov. 22, 2007

(30) Foreign Application Priority Data

Apr. 5, 2006 (EP) .................................... 06425235

(51) Int. Cl.
*H04N 7/01* (2006.01)
(52) U.S. Cl. .............................. 375/240.01; 348/E7.013
(58) Field of Classification Search ........................ None
See application file for complete search history.

(56) References Cited

U.S. PATENT DOCUMENTS

| | | | |
|---|---|---|---|
| 5,796,439 A | 8/1998 | Hewett et al. | |
| 2001/0017889 A1* | 8/2001 | Borer | 375/240.16 |
| 2003/0053537 A1* | 3/2003 | Kim et al. | 375/240.01 |
| 2003/0067981 A1* | 4/2003 | Zhao et al. | 375/240.08 |
| 2003/0156639 A1 | 8/2003 | Liang | |
| 2004/0156624 A1 | 8/2004 | Kent, Jr. et al. | |
| 2005/0249288 A1* | 11/2005 | Ha | 375/240.16 |
| 2007/0067480 A1* | 3/2007 | Beek et al. | 709/231 |
| 2007/0229703 A1* | 10/2007 | Lu | 348/441 |

FOREIGN PATENT DOCUMENTS

| | | |
|---|---|---|
| EP | 0 475 499 | 3/1992 |
| EP | 0 637 889 | 2/1995 |
| GB | 2281835 A | 3/1995 |
| WO | WO 9847293 A | 10/1998 |

OTHER PUBLICATIONS

Alfonso D., Bagni D., Moglia D., "Bi-directionally motion-compensated frame-rate up-conversion for H.264/AVC decoders", 41-44, ELMAR, 2005, 47th International Symposium, Jun. 8-10, 2005.
European Search Report, European Patent Office, Sep. 27, 2006.

* cited by examiner

*Primary Examiner* — Gilberto Barron, Jr.
*Assistant Examiner* — Shaun Gregory
(74) *Attorney, Agent, or Firm* — Graybeal Jackson LLP

(57) ABSTRACT

In an embodiment of a method for converting an input video sequence, comprising digital images organized in frames and operating at a variable frame-rate, into an output video sequence, operating at a pre-set constant frame-rate, it is envisaged to store the input video sequence temporarily and to control fetching of images of said temporarily stored input video sequence.
The method moreover envisages:
  controlling fetching of images from the temporarily stored input video sequence by adjusting an emptying rate to form an intermediate video sequence; and
  carrying out an operation of motion-compensated interpolation on the intermediate video sequence to form the output video sequence operating at a pre-set constant frame-rate, the emptying rate being adjusted as a function of a number of images of the input video sequence with variable frame-rate temporarily stored. An application is in the reproduction of video sequences in mobile terminals, with the capacity of audio-video conversation, for example for videoconferences.

19 Claims, 11 Drawing Sheets

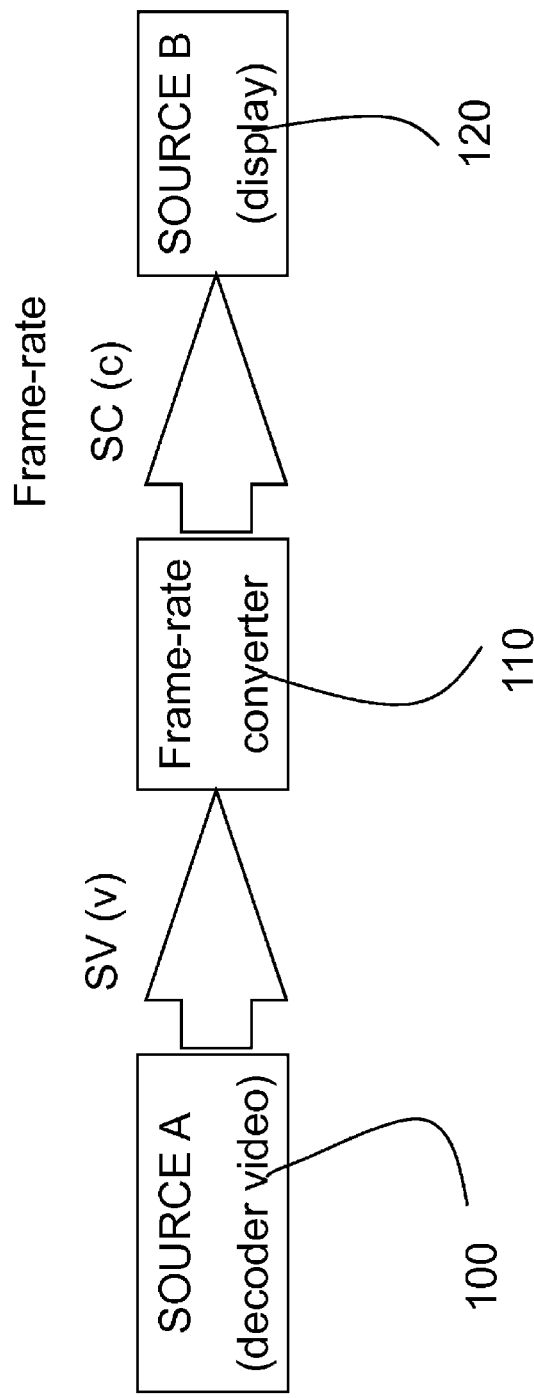
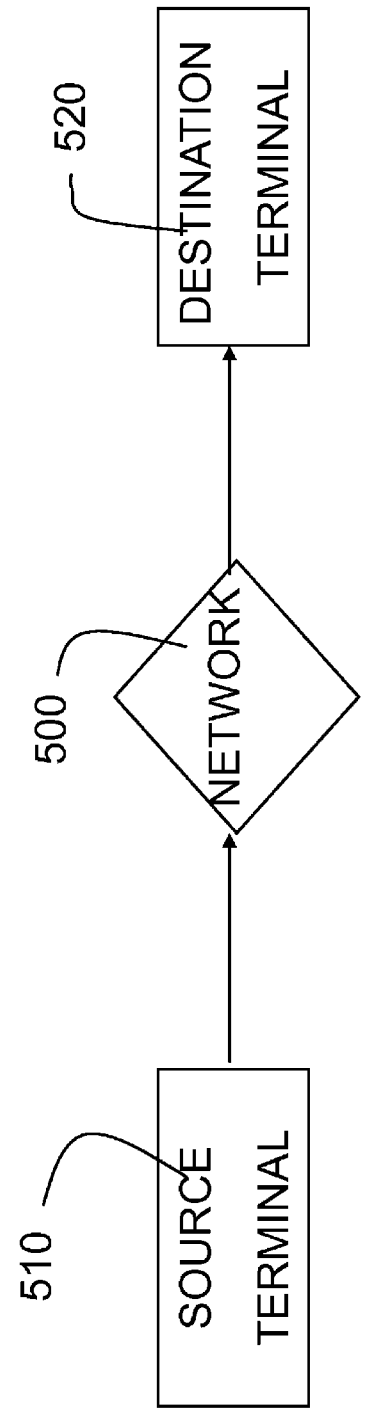

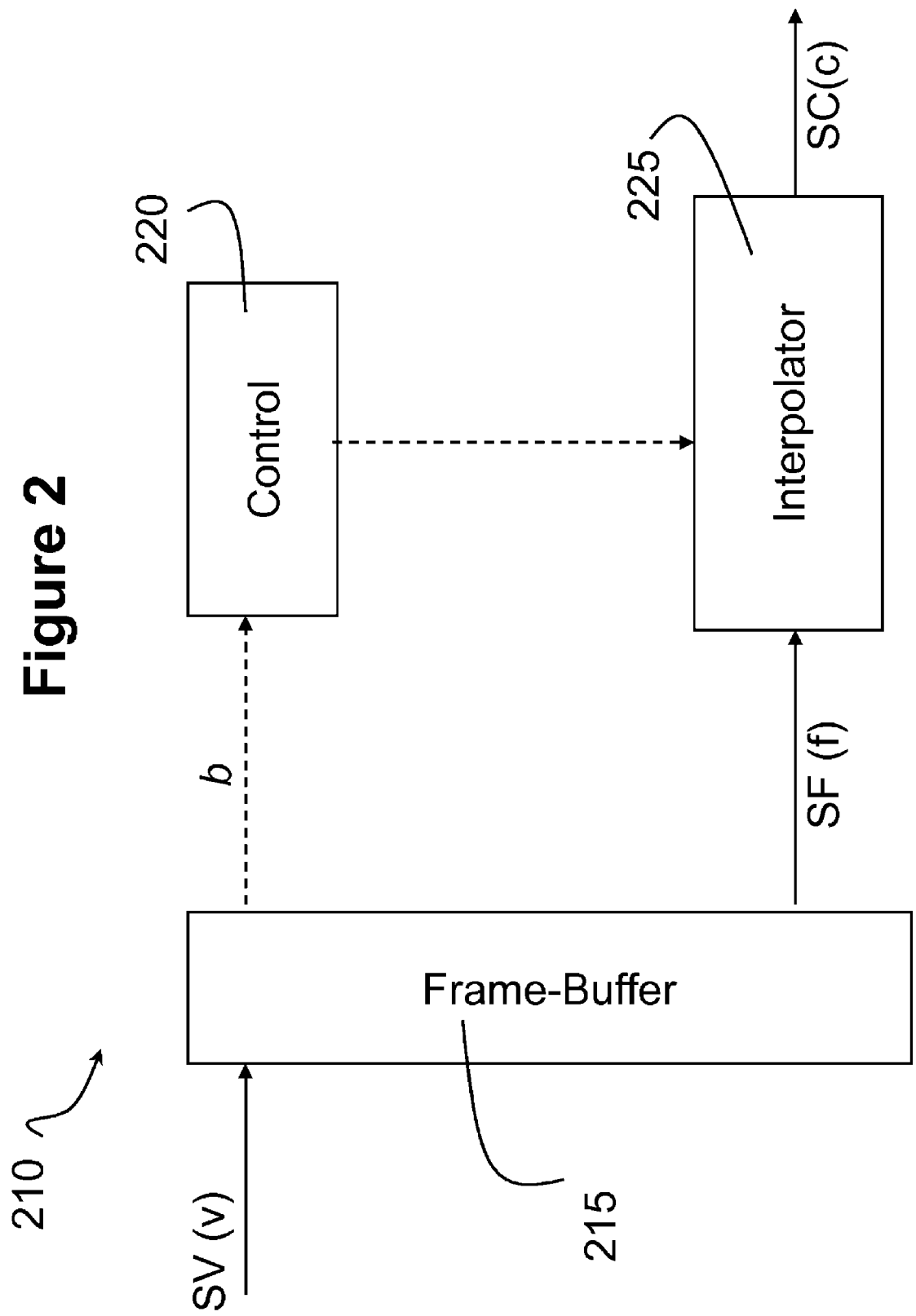

Figure 3
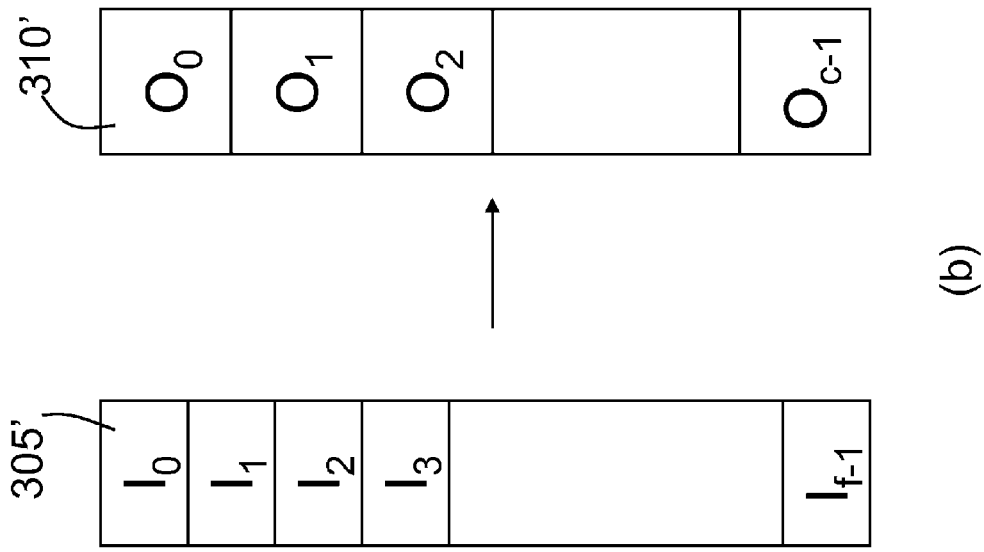
(b)
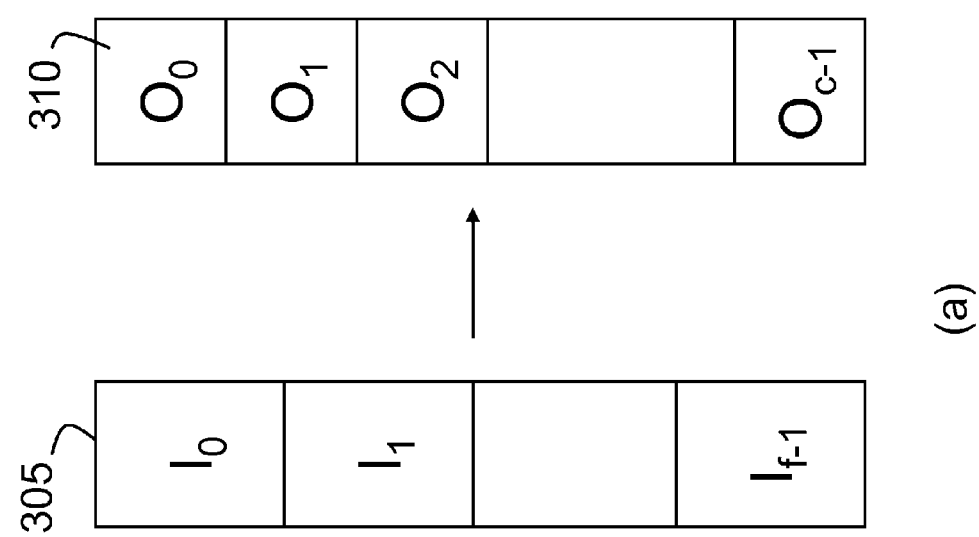
(a)

METHOD FOR THE FRAME-RATE CONVERSION OF A VIDEO SEQUENCE OF DIGITAL IMAGES, RELATED APPARATUS AND COMPUTER PROGRAM PRODUCT

PRIORITY CLAIM

This application claims priority from European patent application No. 06425235.6, filed Apr. 5, 2006, which is incorporated herein by reference.

TECHNICAL FIELD

An embodiment of the present invention relates to techniques for frame-rate conversion of a video sequence of digital images from variable to constant.

An embodiment of the invention has been developed with particular attention paid to its possible application to the reproduction of video sequences in mobile terminals with capacity of audio-video conversation, for example, for videoconferences. The scope of the invention is not, on the other hand, limited to this specific field of application: one or more embodiments of the invention are, in fact, applicable to all systems for processing video sequences in which conditions of operation arise of the same type as the ones described in what follows.

BACKGROUND

By definition, the frame-rate of a video sequence is constituted by the temporal frequency of said sequence, i.e., by the number of digital images, organized in frames, per second that form the sequence itself.

FIG. 1 shows a block diagram representing a system for frame-rate conversion, which comprises a source video system 100, which produces at output a video sequence SV of images with variable frame-rate v, and a destination video system 120, which is instead configured for receiving a video sequence SC at constant and pre-set frame-rate c. Consequently, in order to enable transmission of video sequences from the source video system 100 to the terminal video system 120, there is provided a frame-rate converter apparatus 110, which receives at input the video sequence SV with variable frame-rate v and generates at output the conversion into a video sequence SC with constant and pre-set frame-rate c.

In a typical scenario of application, the source video system 100 corresponds to a video decoder, which operates, for example, but not only, according to a standard selected from among video standards such as MPEG-2, MPEG-4, H.264, DivX, and Windows Media Video. In the case where the source video system 100 is, for example, represented by a decoder, it receives a bitstream, compressed through a channel, whether wired or wireless, which may introduce errors and/or variable delay or jitter, so that, according to the delay introduced by the channel itself, the source video system 100 is able to decode the images contained in the bitstream at a higher rate or at a lower rate. The terminal video system 120 can be, for example, a viewing device, i.e., a display, with a pre-set refresh frequency, capable of receiving and displaying a pre-set number of images per second corresponding to the pre-set constant frame-rate c.

The frame-rate converter apparatus can operate according to the known simple method of conversion from a variable frame-rate v to a constant frame-rate c, which envisages the following conditions:

when the variable frame-rate v is higher than the constant frame-rate c, it is envisaged to eliminate the images in excess (frame-skipping operation) avoiding display thereof; and when the variable frame-rate v is lower than said constant frame-rate c, it is envisaged to repeat the input images (frame-repetition operation) a number of times.

It is clear how both the operation of frame skipping and that of frame repetition may cause evident and troublesome temporal display artifacts.

Known from U.S. Pat. No. 5,796,439, which is incorporated by reference, is, for example, a method for reduction of the frame-rate of a video sequence by means of selective frame skipping.

European patent application No. EP-A-0 637 889, which is incorporated by reference, describes a method for varying the frame-rate of a video sequence by means of motion-compensated interpolation. However, the method is not dynamic and has only the purpose of doubling the frame-rate of the video sequence to be displayed. A similar method for frame-rate doubling is also known from European Patent Application No. EP-A-0 475 499, which is also incorporated by reference.

The U.S. Patent Application Publication No. US2004/156624, which is incorporated by reference, describes a system capable of dynamic adaptation of the rate of display of a digital video sequence via a buffering operation, i.e., an operation of temporary storage, and subsequent check on the buffer. However, said system does not render the output frame-rate constant.

SUMMARY

An embodiment of the present invention provides a solution capable of converting progressively and adaptively the frame-rate from variable to constant, preventing both the loss of images and repeated display.

According to an embodiment of the present invention, said purpose is achieved thanks to a method for conversion of an input video sequence comprising digital images organized in frames and operating at a variable frame-rate into an output video sequence operating at a pre-set constant frame-rate. The embodiment also relates to the corresponding conversion apparatus, as well as the corresponding computer program product, directly loadable into the memory of a computer such as a processor and comprising software code portions for performing a method according to an embodiment of the invention when the product is run on a computer.

An embodiment of the invention provides a frame buffer, which receives at input the video sequence with variable frame-rate and temporarily stores the images thereof. Said frame buffer is emptied at an emptying rate, which can be adjusted under the control of a control module, and is sent onto an interpolation module, which, via operations of motion-compensated interpolation, supplies the number of images necessary for maintaining the output frame-rate constant.

As compared to known solutions, an embodiment proposed herein provides an apparatus that is not subject to problems of overflow of the frame buffer, and, moreover, does not discard or add images, but interpolates them adaptively, and is hence able to make up for a variety of problems that can occur between a source terminal and a destination terminal, amongst which problems of jitter, problems of slowed-down reproduction, reconstruction of missing images, and need for fixed-rate oversampling.

BRIEF DESCRIPTION OF THE DRAWINGS

One or more embodiments of the invention will now be described, purely by way of non-limiting example, with reference to the annexed plate of drawings.

FIG. 1, in itself corresponding to the known art, has already been described previously.

FIG. 2 shows a block diagram of an apparatus for frame-rate conversion according to an embodiment of the invention.

FIG. 3 shows a diagram corresponding to images used in a mode of operation of the apparatus according to an embodiment of the invention.

FIG. 7 represents a working diagram of a context of application of the conversion apparatus according to an embodiment of the invention.

DETAILED DESCRIPTION

Figure 4:
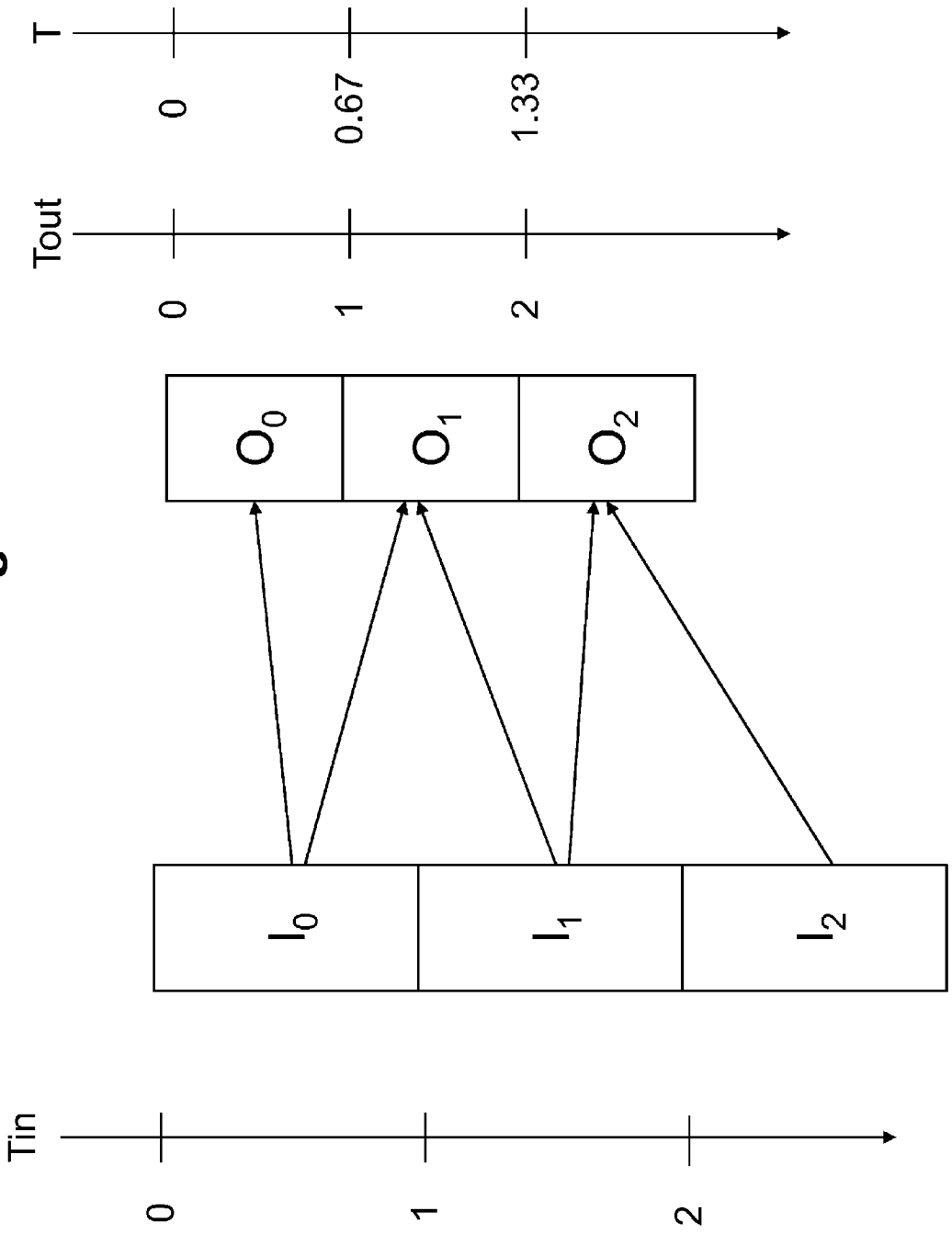
FIG. 4 shows a diagram corresponding to images used in a further mode of operation of the apparatus according to an embodiment of the invention.

FIG. 2 shows a frame-rate apparatus designated as a whole by the reference number 210. Said converter apparatus 210 comprises a frame-buffer module 215 which receives at input the input video sequence SV with variable frame-rate v. Said frame-buffer module 215 is a buffer, or transmit memory, that is able to contain up to a maximum number N of video images. Said frame-buffer module 215 is in particular a buffer of a FIFO (First-In/First-Out) type, so that the first image of the input video sequence SV introduced into the frame-buffer module 215 is also the first to be fetched.

The conversion apparatus 210 further comprises a logic control module 220, which receives from the frame-buffer module 215 an item of information on a filling level b thereof, i.e., an item of information indicating a number of images of said input video sequence SV temporarily stored in said frame-buffer module 215, as well as an image-interpolation module 225, which is controlled in its operation by said logic control module 220 and receives from the frame-buffer module 215 an intermediate video sequence SF operating at an emptying rate f. Said emptying rate f is also in general a rate that varies according to the need, as will be described in greater detail in what follows.

Said conversion apparatus 210, in particular as regards the image-interpolation module 225, can be implemented either by a dedicated hardware or by a software program run by a microprocessor, or else by any sharing of hardware and software resources whatsoever.

Operation of the conversion apparatus 210 occurs in the way described in what follows.

The frame-buffer module 215 is filled by the input video sequence SV at the variable rate v, not known a priori, and is emptied at the emptying rate f, which is also variable, by the interpolation module 225.

The filling level b of the frame-buffer module 215 corresponds to the number of images contained therein, a number which is comprised between zero and the maximum number of images N.

The logic control module 220 has the task of determining at each instant in time said filling level b of the frame-buffer module 215, and, on the basis of its value, determining the emptying rate f, according to the following criteria:

should the filling level b of the frame-buffer module 215 be higher than a pre-set maximum threshold value SMAX, this indicates the fact that the frame-buffer module 215 is being filled too fast so that it should be emptied faster than usual in order to avoid occurrence of overflow; in this case, the emptying rate f=c+k, i.e., it equals the sum of the constant frame-rate c to be obtained in the output video sequence SC and a pre-set correction value k;

should the filling level b of the frame-buffer module 215 be less than a pre-set minimum threshold value SMIN, this indicates the fact that the frame-buffer module 215 is being filled too slowly so that it should be emptied more slowly than usual in order to avoid occurrence of underflow; in this case, the emptying rate f=c−k, i.e., it equals the difference between the constant frame-rate c to be obtained in the output video sequence SC and the pre-set correction value k;

should the filling level b of the frame-buffer module 215 be comprised between the minimum threshold value SMIN and the maximum threshold value SMAX, there is no danger of occurrence of underflow or of overflow, so that the emptying rate f=c, i.e., equal to the constant rate c to be obtained in the output video sequence SC.

Basically, therefore, the logic control module 220 implements a procedure comprising the following operations, expressed in a formalism of programming pseudocode:

if (b>SMAX) then $f=c+k$ else if (b<SMIN) then $f=c-k$ else f=c

Said procedure can be extended by defining a number of maximum threshold values SMAX (i) and minimum threshold values SMIN (i), and by defining a number of correction values k (i), which determine a number of values of the emptying rate f, as described in the following example:

if (b>SMAX1) then $f=c+k1$ else if (b>SMAX2) then $f=c+k2$ else if (b<SMIN1) then $f=c-k3$ else if (b<SMIN2) then $$f=c-k4$$

else $$f=c$$

The image-interpolation module 225, as has been said, receives at input a sequence of intermediate images SF at an emptying rate f and returns at output the sequence of output images SC with pre-set constant frame-rate c. The value assumed by said emptying rate f as a function of the filling level b is known through the logic control module 220. Hence, in other words, the task of the image-interpolation module 225 is to generate a number c of output images every number f of input images, interpolating the images available at input in the intermediate sequence SF. Each image in the output video sequence SC is generated by interpolating in the intermediate sequence SF the input images closest in time, i.e., the immediately preceding image and the immediately subsequent one.

Three possible cases may arise:
the emptying rate f is equal to the constant frame-rate c;
the emptying rate f is lower than the constant frame-rate c; and
the emptying rate f is higher than the constant frame-rate c.

In the first case, the interpolation module 225 does not need in actual fact to perform any operation so that its output video sequence SC is equal to the intermediate video sequence SF.

In the second case, the input emptying rate f is lower than the output constant frame-rate c; hence the interpolation module 225 must produce a number of images higher than that of the images fetched by the frame-buffer module 215.

This case is represented in FIG. 3a, where a vector of input images 305 represent the images $\{I_0, \ldots, I_{f-1}\}$ belonging to the intermediate video sequence SF at input to the interpolation module 225, whilst a vector of output images 310 represents the images $\{O_0, \ldots, O_{c-1}\}$ belonging to the video sequence SC at output from the interpolation module 225.

In the third case, the input emptying rate f is higher than the output constant frame-rate c. This means that the interpolation module 225 must produce a number of images lower than that of the images fetched by the frame-buffer module 215. This case is represented in FIG. 3b, shown in which is a vector of input images 305' that contains a number f of images $\{I_0, \ldots, I_{f-1}\}$ higher than the number c of output images $\{O_0, \ldots, O_{c-1}\}$.

The image-interpolation module 225 is able to generate an image, designated as a whole by $O_k$, occurring at a display instant in time $t_k$, given at least one image $I_p$ preceding in time occurring at the previous instant $t_p$ (with $t_p < t_k$) and at least one image $I_s$ subsequent in time occurring at the subsequent instant $t_s$ (with $t_s > t_k$) via procedures of scaled motion-compensation and weighted filtering, where the scaling of the motion vectors and the filtering weight are proportional to the distance in time between images.

By way of example, assuming an emptying rate f of 20 Hz and a required constant frame-rate c of 30 Hz, the conversion ratio is hence 3 to 2 so that the interpolation module 225 must generate three output images every two input images. This case is represented in FIG. 4, appearing in which are a time axis Tin of the input images and a time axis Tout of the output images. In order to bring the two axes Tin and Tout to the same scale, the times corresponding to the time axis Tout of the output images are multiplied by a scaling factor f/c equal to ⅔, i.e., 0.67, to obtain a new time reference, i.e., a scaled time axis T that corresponds to the axis of the input times Tin. For simplicity, reference will be made in what follows to said scaled time axis T.

It is clear that the first output image $O_0$ is exactly the same as the first input image $I_0$, since the display instant $t_k$ is the same.

The second output image $O_1$, the display instant of which on the scaled axis T is 0.67, is obtained by interpolating the first input image $I_0$ and a second input image $I_1$, attributing a lower weight to the first input image $I_0$ and a higher weight to the second input image $I_1$. The weight of said second input image $I_1$ is calculated, in fact, as $$T(O_1)-T(I_0)=(0.67-0)=0.67,$$

whilst the weight attributed to the first input image $I_0$ is $$T(I_1)-T(O_1)=1-0.67=0.33.$$

The second output image $O_2$ is obtained by interpolating the first input image $I_1$ and the second input image $I_2$, assigning a higher weight to $I_1$ (0.67) and a lower weight to $I_2$ (0.33).

In general, for each image generated at output $O_k$ whereby the scaled time is T, the instant in time of the preceding reference is given by floor (T) and that of the subsequent reference is given by ceiling (T).

In addition, the weight of the subsequent reference is T-floor (T), and that of the preceding reference is ceiling (T)-T.

In the case where the scaled time T at which the image generated at output $O_k$ occurs is represented by an integer, it is not necessary to carry out any interpolation, and the output image is obtained by copying the input image.

The method can be readily extended to a number of preceding and subsequent reference images.

Figure 5:
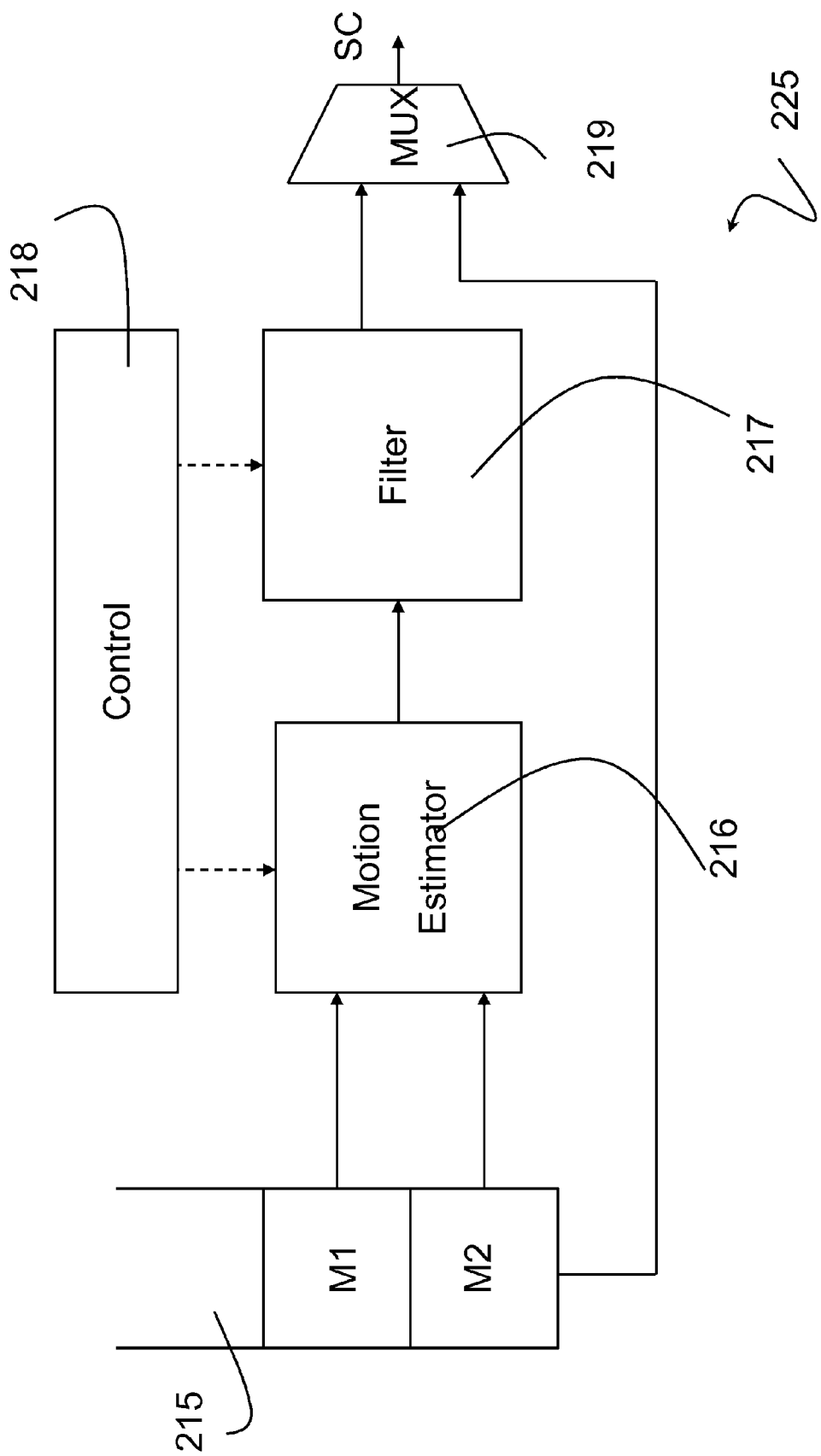
FIG. 5 represents a block diagram of an interpolation module comprised in the conversion apparatus of FIG. 1 according to an embodiment of the invention.

FIG. 5 shows in detail the architecture of the image-interpolation module 225, which comprises two memories M1 and M2 for recording the two input images, i.e., the preceding one $I_p$ and the subsequent one $I_s$, to be interpolated. In effect, said two memories M1 and M2 coincide with the last two locations of the FIFO frame-buffer module 215 of FIG. 2.

A motion-estimation block 216 receives from said two memories M1 and M2 the two input images, performing on the basis thereof the bi-directional motion estimation.

A filtering block 217 receives the output motion-estimation block 216 generating the output image.

A control block 218, which operates under the control of the control module 220, performs the specific function of determining the weights of the two input images, i.e., the preceding one $I_p$ and subsequent one $I_s$, with respect to the image $O_k$ to be reconstructed.

A multiplexer 219 carries out a selection between its two inputs, which correspond to the output of the filtering block 217 or else to the contents of the memory M2, which is the last location of the FIFO memory containing the input image. According to the selection, the multiplexer 219, under the control of the module 220, returns at output the image reconstructed by interpolation or else the input image.

Figure 6:
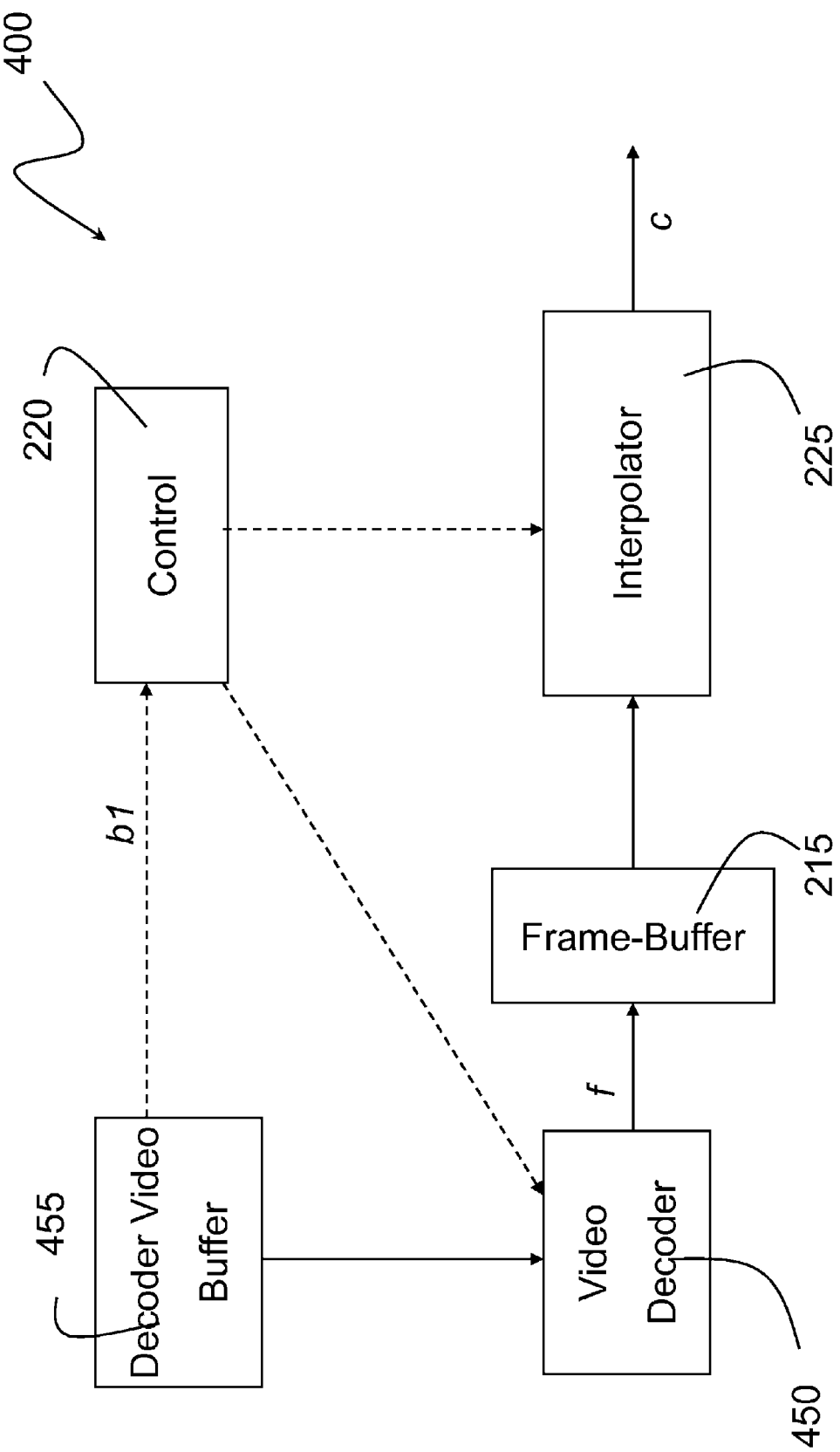
FIG. 6 shows a further embodiment of the conversion apparatus.

FIG. 6 represents a frame-rate conversion apparatus 400 that constitutes an alternative embodiment as compared to the frame-rate conversion apparatus 210 shown in FIG. 2.

In said figure, the reference number 450 designates a video decoder. Said video decoder 450, which can be, for example, a video decoder operating according to the standard ITU H.264, in itself comprises a video-decoder buffer 455, which is used to store the images at input to the decoder 450 that are stored prior to the subsequent decoding by the video decoder 450 itself. Cascaded downstream of the video decoder 450 are the frame-buffer module 215 and the interpolation module 225, operating under the control of the logic control module 220.

In this case, the logic control module 220 is provided to verify no longer the filling level b1 of the frame-buffer module 215, as in the conversion apparatus 210, but rather a filling level b1 of the video-decoder buffer 455, consequently controlling the instant of decoding of an image by the video decoder 450 to prevent overflow or underflow of the video-decoder buffer 455.

If f is the emptying rate of the video-decoder buffer 455 by the video decoder 450, b1 is the filling level of the video-decoder buffer 455, and SMAX and SMIN are the two thresholds, respectively, the maximum one and the minimum one, the control can be implemented as in the previous case, i.e.:

if (b1>SMAX) then $$f=c+k$$

else if (b1<SMIN) then $$f=c-k$$

else $$f=c$$

In this embodiment, the frame buffer 215 set between the decoder 450 and the interpolation module 225 comprises only two memory locations, previously designated by M1 and M2, designed to store the two input images to be interpolated.

An advantage of the solution implemented in the frame-rate conversion apparatus 400 shown in FIG. 6 includes memory saving, due to the fact that the images are stored in the compressed form within the video-decoder buffer 455, and are decoded only when necessary, following the commands of the control logic 220.

The apparatus and methods described up to now afford multiple applications in streaming of video sequences.

Some of said applications will now be described, with reference to the diagram shown in FIG. 7, which represents the technical context in which said applications operate. FIG. 7 hence shows a terminal source 510, which transmits encoded video data. A transmission network 500 receives said transmitted encoded video data and conveys them from the source terminal 510 to a destination terminal 520, which receives said encoded video data.

The conversion apparatus 210 and 300 can be applied to a procedure of adaptive frame-rate conversion.

In this case, it is assumed that the network 500 is subject to jitter, on account of which the destination terminal 520 does not have the possibility of receiving a constant stream of data.

In other words, at a given instant the destination terminal 520 is found to receive less data than expected, and hence reproduces a video sequence with a lower frame-rate than it should; at another instant the destination terminal 520 receives more data, and consequently can find itself having to discard some data if its own receiver buffer is full.

The apparatus and the method proposed enable the destination terminal 520 to process the input images in such a way as to convert the sequence received, which has a variable frame-rate on account of jitter, into a sequence with constant bit-rate, which can then be reproduced correctly without display artifacts that would cause degradation in the service quality.

Figure 8:
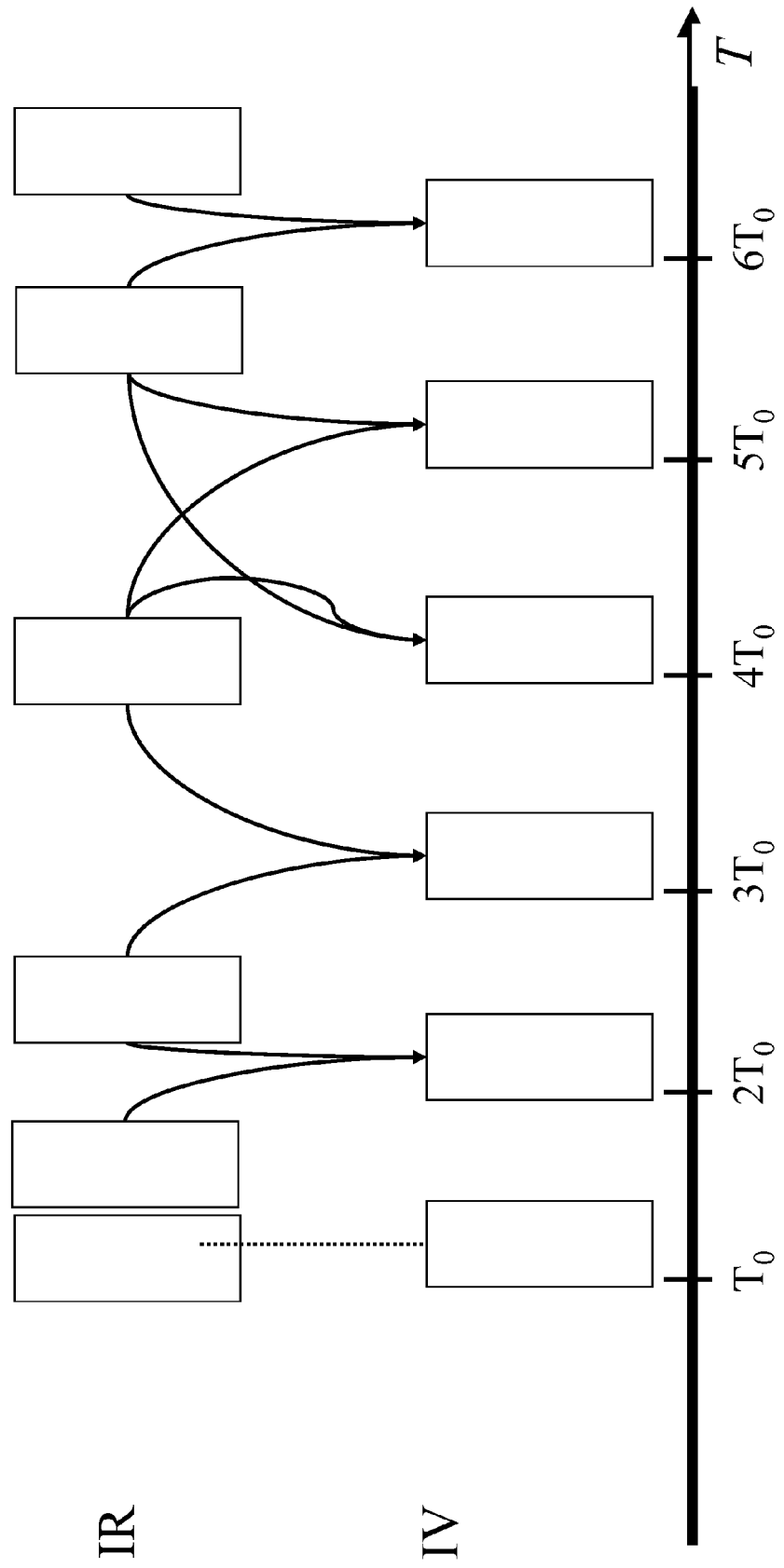
FIG. 8 represents a diagram of a first application of the conversion apparatus according to an embodiment of the invention.

The situation is described in FIG. 8, where a series IR of images received at different times is converted into a series of displayed images IV scanned at a regular time interval $T_0$.

Another possible application is in the case of slowed-down reproduction.

This can occur, for example, in the case where the network 500 undergoes a type of delay such that the images are not received at regular intervals, but in packets of variable size, referred to as bursts, followed by silent intervals.

Figure 9:
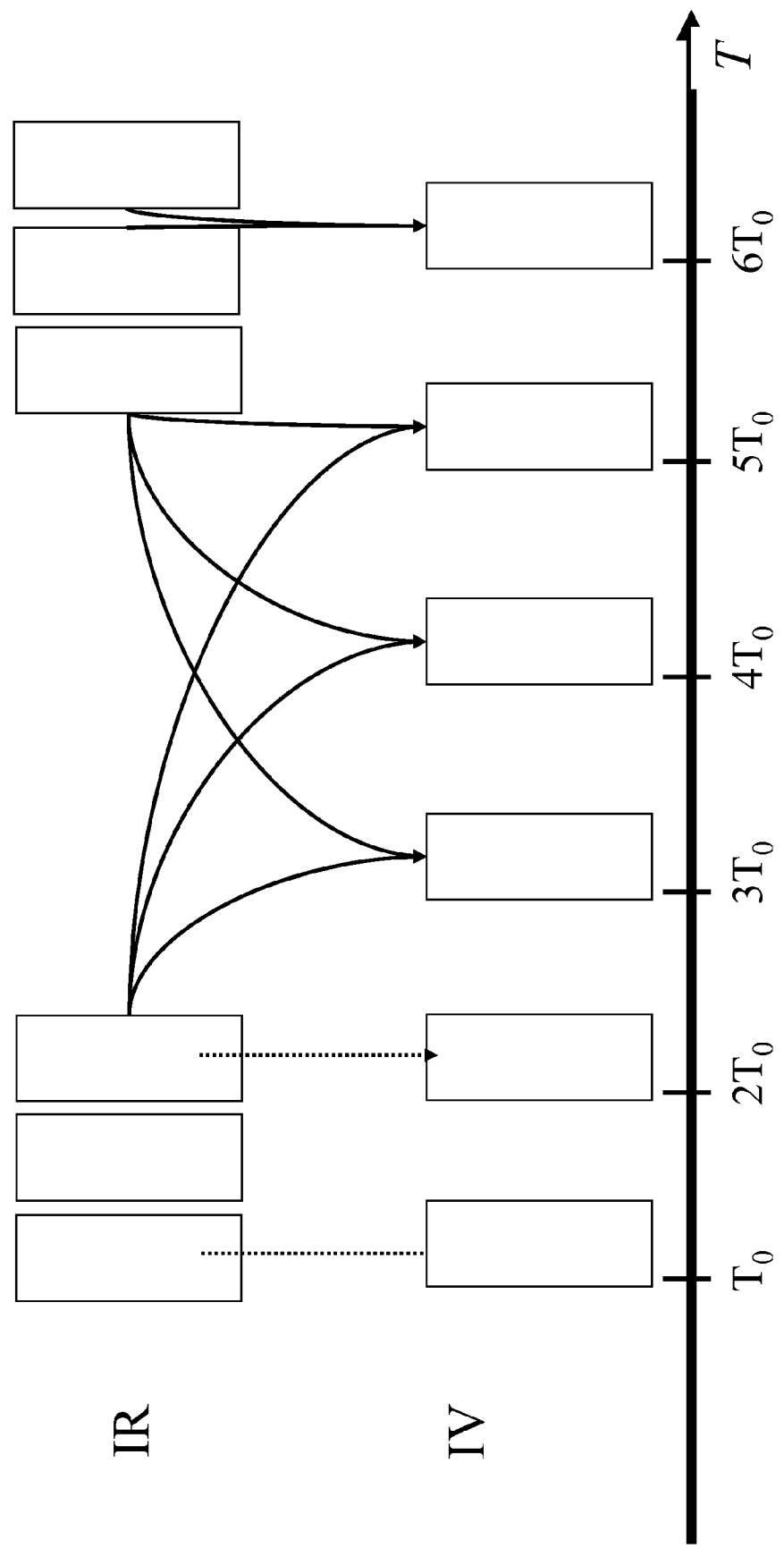
FIG. 9 represents a diagram of a second application of the conversion apparatus according to an embodiment of the invention.

In a way similar to what occurs in the previous case, the apparatus and method proposed are capable of carrying out the frame-rate conversion so as to be able to display a sequence at a constant frame-rate without artifacts, operating according to the procedures of motion-compensated interpolation described with reference to FIGS. 3 and 4 on bursts B and silent intervals S of the received images IR and stored images IV as represented in FIG. 9.

Another possible application regards the case of need for frame reconstruction.

In this case, it is assumed that the network 500 is subject to data losses, so that the destination terminal 520 at the receiver end has not the possibility of receiving all the images sent on the network 500 by the source terminal 510 at the transmitter end.

Figure 10:
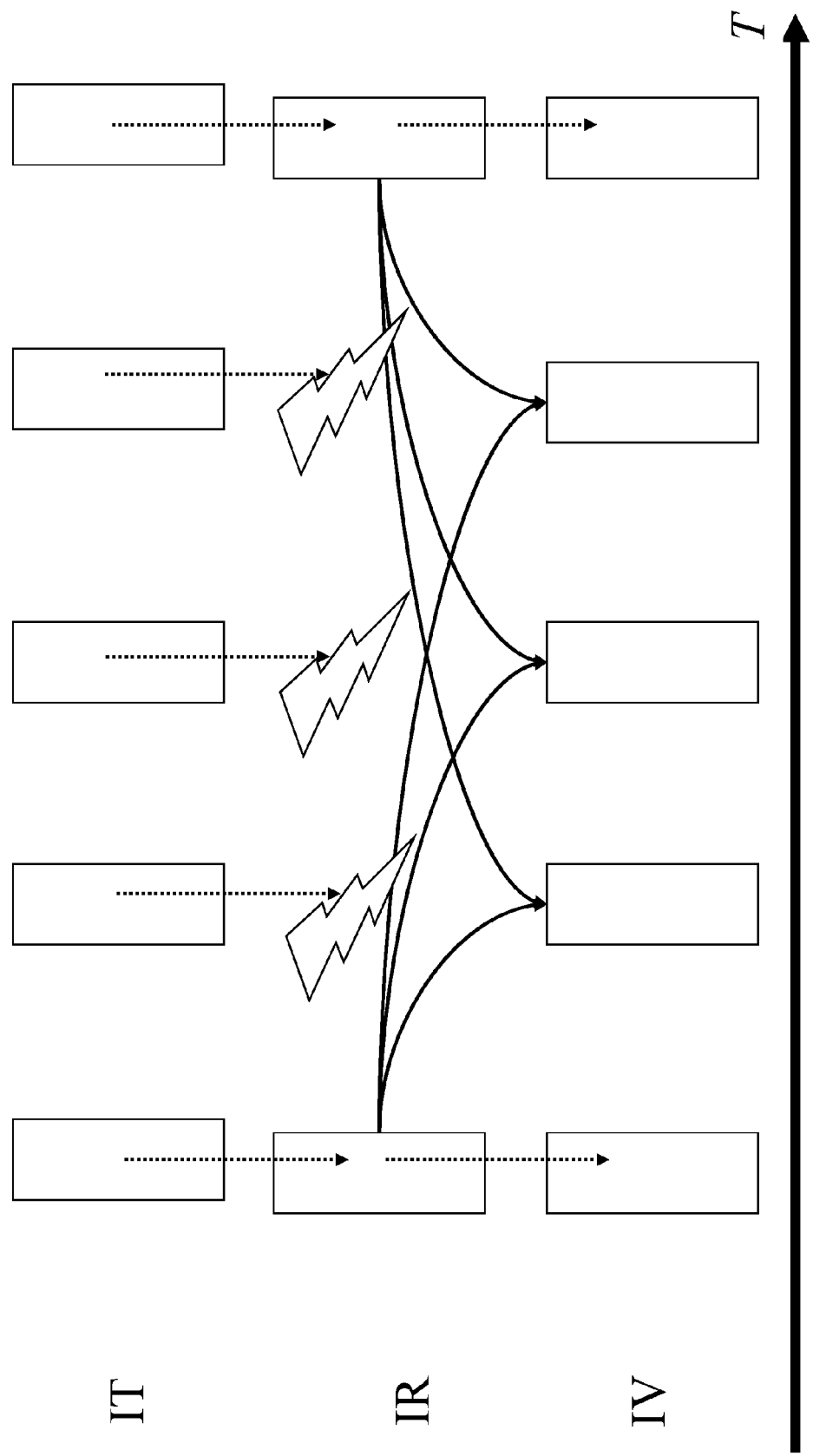
FIG. 10 represents a diagram of a third application of the conversion apparatus according to an embodiment of the invention.

As is shown in FIG. 10, therefore, some of the transmitted images IT become received images IR at the destination terminal 520, which present various missing elements.

Thanks to the motion-compensated interpolation of the images, the system proposed can then carry out reconstruction of the missing images and propose a complete sequence of stored images IV.

Another possible application regards the case of need for fixed-rate oversampling.

Figure 11:
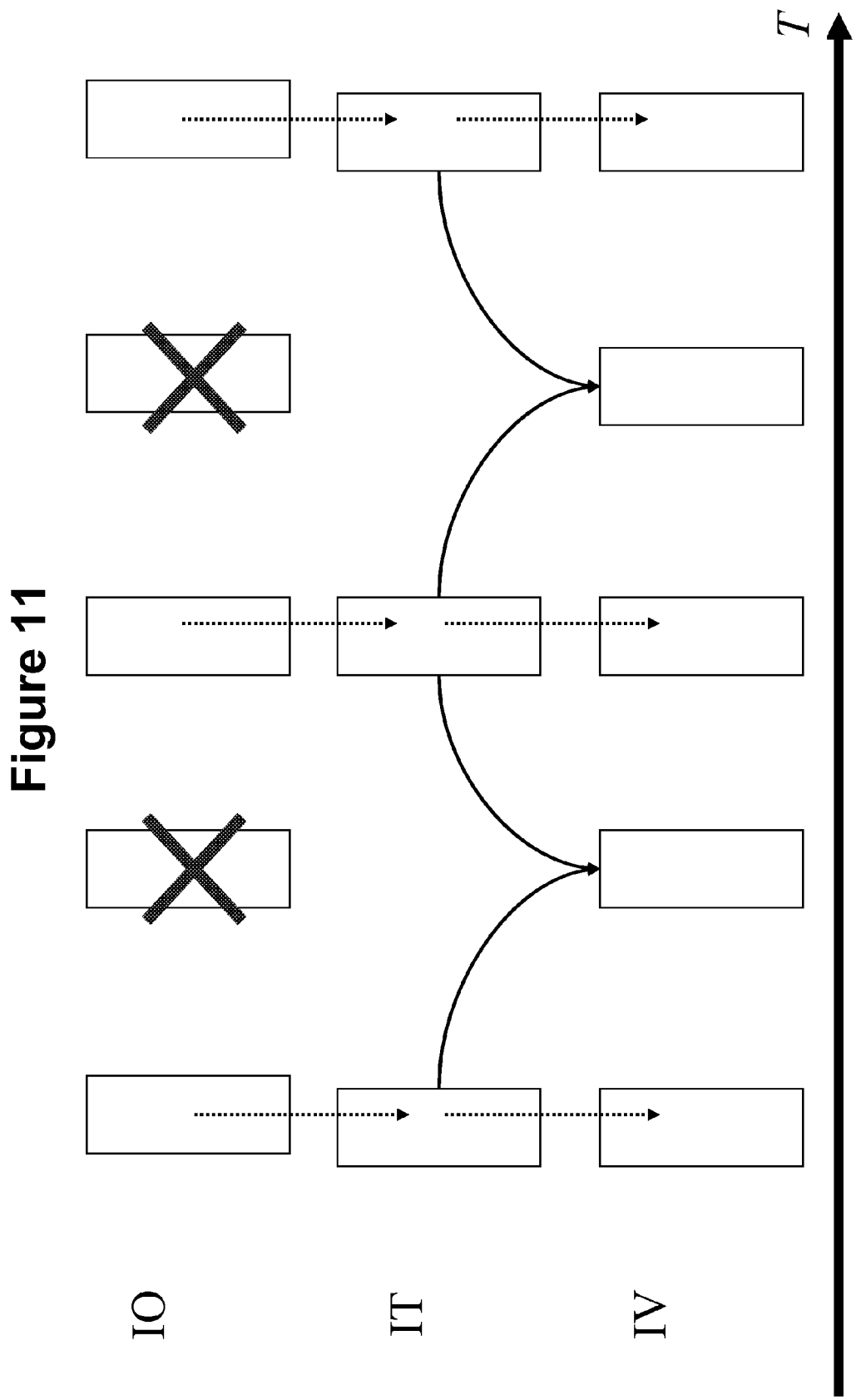
FIG. 11 represents a diagram of a fourth application of the conversion apparatus according to an embodiment of the invention.

In this case, it is assumed that the network 500 is not able to guarantee a bandwidth sufficient to convey all the data that the terminals would wish to exchange. Consequently, the source terminal 510 at the transmitter end is forced to send a video sequence of transmitted images IT with a reduced frame-rate with respect to a sequence of original images IO, for example a halved frame-rate, as shown in FIG. 11. If, however, the frame-rate of the sequence received at the destination terminal 520 is not able to satisfy the quality of the service required, the destination terminal 520 at the receiver end carries out, via the apparatus according to an embodiment of the invention, an oversampling of the input video sequence so as to obtain the appropriate frame-rate, as shown in FIG. 11.

Figure 12:
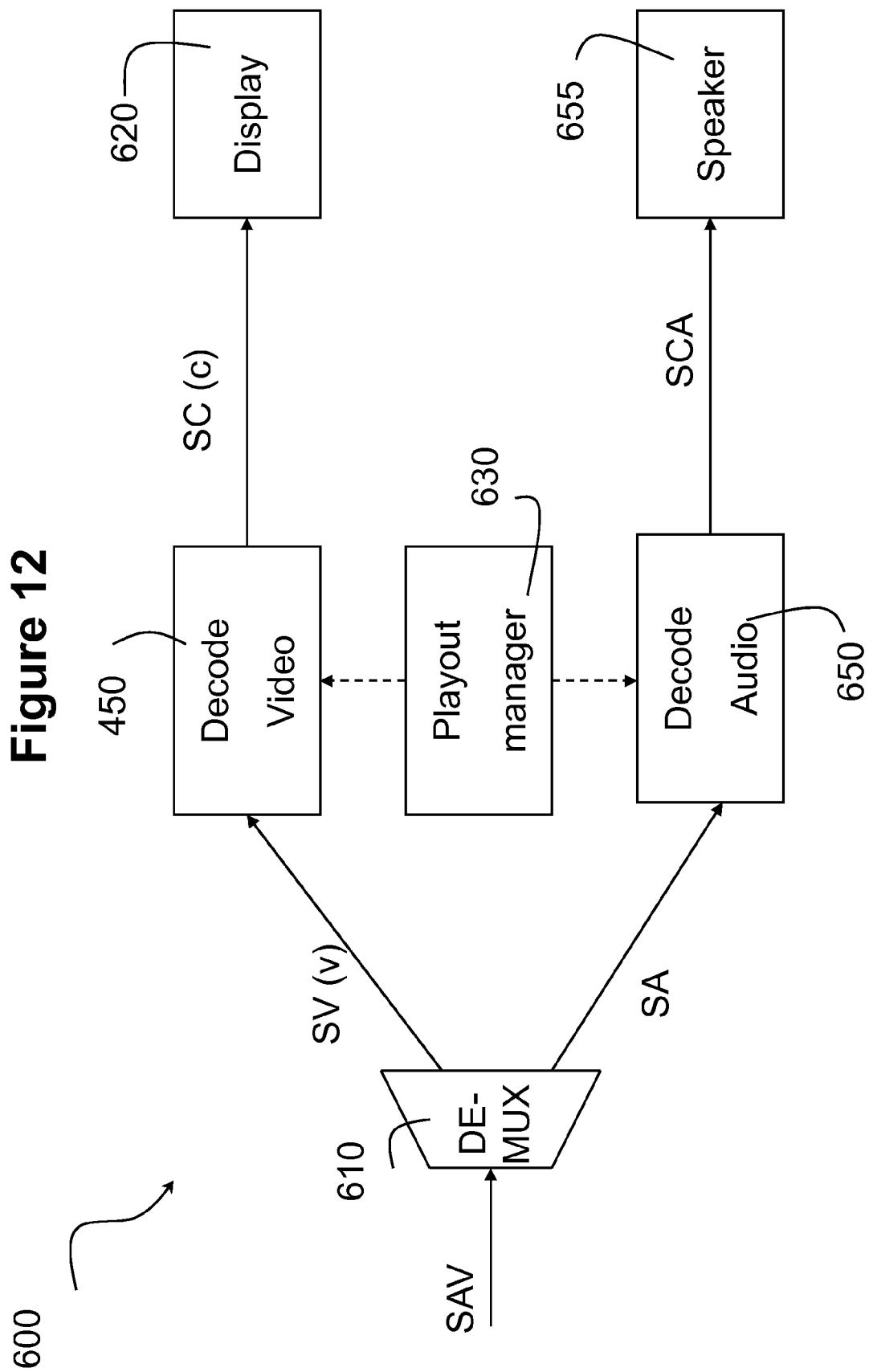
FIG. 12 represents a block diagram of an architecture of an audio-video system designed to implement the conversion apparatus according to an embodiment of the invention.

The apparatus and method proposed can moreover be introduced in a system 600 comprising both video-decoding operations and audio-decoding operations, as shown in FIG. 12.

In this case, a demultiplexer 610 receives a sequence of audio-video data SAV and operates to direct the video sequence SV comprised in said sequence of audio-video data SAV to a video decoder 450, which decodes the compressed video data to display them on a display 620, whilst an audio sequence SA also comprised in said sequence of audio-video data SAV is sent to an audio decoder 550.

From the video decoder 450 there is then supplied the output video sequence SC with constant frame-rate to a display device 620, for example the display of a mobile terminal of a mobile telecommunications network. Of course, the display device 620 could also be on a fixed terminal.

The audio decoder 650 decodes the compressed audio data to send them in a constant-rate stream SCA to a loudspeaker 655, for example the loudspeaker of a mobile terminal. Said audio decoder 650 that carries out conversion of the audio-reproduction stream can in general adopt dejitter techniques, based upon a class of algorithms of time stretching of the data packets.

The system 600 enables a continuous reproduction of a digital audio-video stream in the case where the compressed data are received through a network with errors and/or jitter. For this purpose, the system 600 comprises a reproduction-management or playout-manager block 630, which controls both the video decoder 450 and the audio decoder 650, performing at least the following three functions:

conversion of the video-reproduction stream from variable to constant, in so far as it englobes a conversion apparatus 400, which is similar to what is illustrated in FIG. 6 and co-operates in a similar way with the video decoder 450;

conversion of the audio-reproduction stream from variable to constant; and synchronization of the reproduction of the output video stream SC and audio stream SAC.

The embodiment just described may enable considerable advantages to be achieved as compared to known solutions.

An apparatus for frame-rate conversion of a video sequence of digital images hence advantageously enables adaptation of a sequence with variable frame-rate into a sequence with constant frame-rate, using a method of interpolation that may avoid the need to discard or roughly repeat images for the purpose of adapting the frame-rate. The adoption of interpolation may considerably improve the quality of the image and may enable various other problems that arise in the transmission between a source terminal and a destination terminal to be overcome, such as problems of jitter, slowed-down reproduction, need for lost-frame reconstruction, and need for fixed-rate oversampling.

Advantageously the combined use of a buffer and of an interpolator may enable management of delays imposed by the network that are not known a priori and are even of a very long time duration, without running risk of overflow or underflow, with consequent loss of images, which would be obtained using the buffer alone. In addition, a possible buffer of very large dimensions for taking into account long delays, would introduce in turn a constant delay proportional to the dimension of the buffer, said delay not being acceptable for some applications of practical importance, such as, for example, video conversation.

In addition, advantageously, a frame-rate conversion apparatus can readily be integrated in a system comprising both video decoding and audio decoding, enabling ease of synchronization, via adaptation of the frame-rate, of the video sequences with the audio sequences.

Of course, without prejudice to the principle of the invention, the details of construction and the embodiments may vary widely with respect to what is described and illustrated herein, without thereby departing from the spirit and scope of the present invention.

Even though the interpolator used in a method and in an apparatus according to one or more embodiments of the invention can be indifferently chosen between various types of interpolators of images present in the literature, an example of a possible interpolator that can be used as image-interpolation module is contained in the publication by Alfonso D., Bagni D., Moglia D. "Bi-directionally motion-compensated frame-rate up-conversion for H.264/AVC decoders", 41-44, ELMAR, 2005, 47th International Symposium, Jun. 8-10, 2005, which is incorporated by reference.

What is claimed is:

1. A method, comprising:
receiving, at a receiver, a first input data block associated with a first time;
receiving, at the receiver, a second input data block associated with a second time; and
generating an output data block at an output of the receiver, the output data block associated with a third time by interpolating a region of the output data block from corresponding first and second regions of the first and second input blocks using respective first and second weightings, the third time between the first and second times, the first weighting proportional to a difference between the second and third times, and the second weighting proportional to a difference between the first and third times.

2. The method of claim 1 wherein:
the first weighting equals a quotient of the difference between the second and third times and a difference between the first and second times; and
the second weighting equals a quotient of the difference between the first and third times and the difference between the first and second times.

3. The method of claim 1 wherein generating the output data block further comprises:
scaling a first luminance of the first corresponding region using the first weighting;
scaling a second luminance of the second corresponding region using the second weighting; and
interpolating the region of the output data block by combining the scaled first and second luminances to generate a luminance of the interpolated frame.

4. The method of claim 1 wherein generating the output data block further comprises:
scaling a first luminance of the first corresponding region by multiplying the first luminance by a quotient of the first weighting and a difference between the first and second times;
scaling a second luminance of the second corresponding region by multiplying the second luminance by a quotient of the second weighting and the difference between the first and second times; and
interpolating the region of the output block by summing the scaled first and second luminances to generate a luminance of the interpolated region.

5. The method of claim 1 wherein generating the output block further comprises:
calculating a location difference between relative locations of the first and second regions; and
interpolating the region of the output block by calculating a relative location of the region equal to the relative location of the first region plus a product of the location difference and a quotient of the first weighting and a difference between the first and second relative times.

6. The method of claim 1 wherein generating the output block further comprises:
calculating a location difference between relative locations of the first and second regions; and
interpolating the region of the output block by calculating a relative location of the region equal to the relative location of the second region minus a product of the location difference and a quotient of the second weighting and a difference between the first and second relative times.

7. The method of claim 1 wherein:
the first input data block comprises a first input image;
the second input data block comprises a second input image; and
the output data block comprises an output image.

8. The method of claim 1 wherein:
the first input data block comprises a first input audio block;
the second input data block comprises a second input audio block; and
the output data block comprises an output audio block.

9. A method, comprising:
receiving, at a receiver, a first input data block associated with a first time;
receiving, at the receiver, a second input data block associated with a second time; and
generating an output data block at an output of the receiver, the output data block associated with a third time by interpolating a relative location of a region of the output data block from relative locations of corresponding first and second regions of the first and second input blocks according to a portion of a motion of the second region relative to the first region, the third time between the first and second times, the portion of the motion proportional to a difference between the third time and one of the first and second times.

10. A data converter, comprising:
a first buffer operable to store a first input data block associated with a first time;
a second buffer operable to store a second input data block associated with a second time; and
an interpolator coupled to the first and second buffers and operable to generate an output data block associated with a third time by interpolating a region of the output data block from corresponding first and second regions of the first and second input blocks using respective first and second weightings, the third time between the first and second times, the first weighting proportional to a difference between the second and third times, and the second weighting proportional to a difference between the first and third times.

11. The data converter of claim 10 wherein the first buffer, second buffer, and interpolator are disposed on a same integrated-circuit die.

12. The data converter of claim 10 wherein the interpolator is disposed on a processor executing program instructions.

13. A data converter, comprising:
a first buffer operable to store a first input data block associated with a first time;
a second buffer operable to store a second input data block associated with a second time; and
an interpolator coupled to the first and second buffers and operable to generate an output data block associated with a third time by interpolating a relative location of a region of the output data block from relative locations of corresponding first and second regions of the first and second input blocks according to a portion of a motion of the second region relative to the first region, the third time between the first and second times, the portion of the motion proportional to a difference between the third time and one of the first and second times.

14. The data converter of claim 13 wherein the first buffer, second buffer, and interpolator are disposed on a same integrated-circuit die.

15. The data converter of claim 13 wherein the interpolator is disposed on a processor executing program instructions.

16. A system, comprising:
a data converter, comprising
a first buffer operable to store a first input data block associated with a first time,
a second buffer operable to store a second input data block associated with a second time, and
an interpolator coupled to the first and second buffers and operable to generate an output data block associated with a third time by interpolating a region of the output data block from corresponding first and second regions of the first and second input blocks using respective first and second weightings, the third time between the first and second times, the first weighting proportional to a difference between the second and third times, and the second weighting proportional to a difference between the first and third times; and
a controller coupled to the data converter.

17. The system of claim 14 wherein the data converter and the controller are disposed on different integrated-circuit dies.

18. A system, comprising:
a data converter, comprising
a first buffer operable to store a first input data block associated with a first time,
a second buffer operable to store a second input data block associated with a second time, and
an interpolator coupled to the first and second buffers and operable to generate an output data block associated with a third time by interpolating a relative location of a region of the output data block from relative locations of corresponding first and second regions of the first and second input blocks according to a portion of a motion of the second region relative to the first region, the third time between the first and second times, the portion of the motion proportional to a difference between the third time and one of the first and second times; and
a controller coupled to the data converter.

19. The system of claim 18 wherein the data converter and the controller are disposed on different integrated-circuit dies.

* * * * *